US008874338B2

(12) United States Patent
Miglioranza

(10) Patent No.: US 8,874,338 B2
(45) Date of Patent: Oct. 28, 2014

(54) METHOD FOR ELECTRONICALLY CONTROLLING A BICYCLE GEARSHIFT AND BICYLE ELECTRONIC SYSTEM

(75) Inventor: Federico Miglioranza, Schio (IT)

(73) Assignee: Campagnolo S.r.l., Vicenza (IT)

( * ) Notice: Subject to any disclaimer, the term of this patent is extended or adjusted under 35 U.S.C. 154(b) by 1038 days.

(21) Appl. No.: 12/133,625

(22) Filed: Jun. 5, 2008

(65) Prior Publication Data

US 2008/0312799 A1    Dec. 18, 2008

(30) Foreign Application Priority Data

Jun. 12, 2007  (IT) .............................. MI2007A1181

(51) Int. Cl.
  *G06F 19/00*  (2011.01)
  *B62M 25/08*  (2006.01)
  *B62M 9/122*  (2010.01)

(52) U.S. Cl.
  CPC .............. *B62M 25/08* (2013.01); *B62M 9/122* (2013.01)
  USPC .................. 701/66; 180/218; 474/80; 477/75

(58) Field of Classification Search
  USPC ....................... 701/66, 51; 474/70, 34, 80, 78; 180/218; 477/75
  See application file for complete search history.

(56) References Cited

U.S. PATENT DOCUMENTS

| 4,490,127 | A | 12/1984 | Matsumoto et al. |
| 4,938,733 | A | 7/1990 | Patterson |
| 4,976,435 | A | 12/1990 | Shatford et al. |
| 5,213,005 | A | 5/1993 | Nagano |
| 5,213,548 | A | 5/1993 | Colbert et al. |
| 5,261,858 | A | 11/1993 | Browning |
| 5,357,177 | A | 10/1994 | Fey et al. |
| 5,470,277 | A | 11/1995 | Romano |
| 5,480,356 | A | 1/1996 | Campagnolo |
| 5,494,307 | A * | 2/1996 | Anderson ..................... 280/236 |
| 5,577,969 | A | 11/1996 | Watarai |
| 5,599,244 | A | 2/1997 | Ethington |

(Continued)

FOREIGN PATENT DOCUMENTS

| CN | 1689905 A | 11/2005 |
| DE | 039 38 454 | 11/1989 |

(Continued)

OTHER PUBLICATIONS

European Search Report, Application No. 08005437.2, dated May 4, 2009.

(Continued)

*Primary Examiner* — Tuan C. To
(74) *Attorney, Agent, or Firm* — Volpe and Koenig, P.C.

(57) ABSTRACT

A method for electronically controlling a bicycle gearshift and a bicycle electronic system, wherein when a gearshifting request is transmitted from an electronic control unit to a driving unit, the driving unit associates a wait for a waiting time therewith. In the case of a multiple gearshifting, the waiting time allows a chain to mesh securely with a toothed wheel. By providing for the wait to be carried out in a driving unit of a derailleur, the computing capability of an electronic control unit is not affected by the management of the wait, and the electronic control unit is free to carry out other functions, for example the management of errors of the electronic system, communication with a display unit or various sensors of the electronic system, etc.

53 Claims, 7 Drawing Sheets

(56) References Cited

U.S. PATENT DOCUMENTS

| | | |
|---|---|---|
| 5,681,234 A | 10/1997 | Ethington |
| 5,728,017 A | 3/1998 | Bellio et al. |
| 5,787,757 A | 8/1998 | Ozaki |
| 5,865,454 A | 2/1999 | Campagnolo |
| 6,047,230 A | 4/2000 | Spencer et al. |
| 6,146,297 A | 11/2000 | Kimura |
| 6,367,833 B1 | 4/2002 | Horiuchi |
| 6,454,288 B1* | 9/2002 | Horiuchi ................ 280/260 |
| 6,467,786 B2 | 10/2002 | Horiuchi |
| 6,634,971 B2 | 10/2003 | Campagnolo |
| 6,679,797 B2 | 1/2004 | Valle |
| 6,757,567 B2 | 6/2004 | Campagnolo et al. |
| 6,767,308 B2* | 7/2004 | Kitamura ..................... 477/7 |
| 6,866,279 B2* | 3/2005 | Fujii ....................... 280/260 |
| 6,877,755 B2* | 4/2005 | Takamoto ................. 280/260 |
| 6,923,355 B2 | 8/2005 | Campagnolo |
| 6,988,739 B2 | 1/2006 | Guderzo et al. |
| 7,121,968 B2 | 10/2006 | Campagnolo |
| 7,159,881 B2 | 1/2007 | Guderzo et al. |
| 7,184,872 B2* | 2/2007 | Guderzo ...................... 701/51 |
| 7,223,189 B2 | 5/2007 | Guderzo et al. |
| 7,292,923 B2* | 11/2007 | Guderzo ...................... 701/51 |
| 7,367,575 B2* | 5/2008 | Matsumoto et al. ......... 280/260 |
| 7,383,103 B2 | 6/2008 | Guderzo et al. |
| 7,651,423 B2* | 1/2010 | Ichida et al. .................. 474/80 |
| 7,686,721 B2* | 3/2010 | Tabe et al. ................... 474/152 |
| 7,736,253 B2* | 6/2010 | Matsumoto et al. .......... 474/81 |
| 8,439,779 B2* | 5/2013 | Florczyk ...................... 474/82 |
| 8,549,955 B2* | 10/2013 | Sato et al. .................... 74/502.2 |
| 2001/0027495 A1 | 10/2001 | Campagnolo ............... 709/248 |
| 2002/0058558 A1* | 5/2002 | Patterson et al. ............. 474/82 |
| 2003/0078716 A1* | 4/2003 | Takeda ......................... 701/51 |
| 2003/0160420 A1* | 8/2003 | Fukuda ....................... 280/260 |
| 2003/0166427 A1* | 9/2003 | Dillon et al. .................. 474/80 |
| 2004/0009835 A1* | 1/2004 | Heim ............................ 474/78 |
| 2004/0051273 A1 | 3/2004 | Fujii |
| 2004/0225380 A1 | 11/2004 | Guderzo |
| 2005/0223840 A1* | 10/2005 | Takamoto .................... 74/502.2 |
| 2005/0255950 A1 | 11/2005 | Takebayashi et al. |
| 2006/0189423 A1* | 8/2006 | Ichida et al. .................. 474/80 |
| 2007/0191159 A1* | 8/2007 | Fukuda ......................... 474/82 |
| 2007/0197324 A1* | 8/2007 | Fujii et al. .................... 474/80 |
| 2007/0213908 A1 | 9/2007 | Guderzo et al. |
| 2007/0232425 A1* | 10/2007 | Ichida ........................... 474/70 |
| 2007/0270719 A1* | 11/2007 | Jwo ............................. 600/587 |
| 2008/0300076 A1* | 12/2008 | Fukushima et al. ........... 474/80 |
| 2008/0312799 A1 | 12/2008 | Miglioranza |
| 2009/0204299 A1 | 8/2009 | Miglioranza |

FOREIGN PATENT DOCUMENTS

| | | |
|---|---|---|
| EP | 0 529 664 A2 | 3/1993 |
| EP | 0 529 664 A3 | 3/1993 |
| EP | 0 605 741 | 7/1994 |
| EP | 1 103 456 A2 | 5/2001 |
| EP | 1 103 456 A3 | 5/2001 |
| EP | 1 238 903 | 9/2002 |
| EP | 1 381 021 | 1/2004 |
| EP | 1381021 A2 | 1/2004 |
| EP | 1 475 302 | 11/2004 |
| EP | 1475302 A1 | 11/2004 |
| EP | 1 500 582 | 1/2005 |
| EP | 1500582 A1 | 1/2005 |
| EP | 1 591 355 | 11/2005 |
| EP | 1 652 769 | 5/2006 |
| EP | 1652769 A1 | 5/2006 |
| JP | 2001-071985 | 3/2001 |
| TW | 533284 B | 5/2003 |
| TW | 593912 B | 6/2004 |
| TW | 200512126 A | 4/2005 |
| TW | 1248411 B | 2/2006 |

OTHER PUBLICATIONS

European Search Report, Application No. 08425069.5, dated Jul. 30, 2008.

Japanese Office Action for Appl. No. 2008-151576 dated Aug. 21, 2012 with English translation.

English translation of Taiwanese Office Action and Search Report issued on Feb. 25, 2013 in corresponding TW Application No. 097121728.

* cited by examiner

METHOD FOR ELECTRONICALLY CONTROLLING A BICYCLE GEARSHIFT AND BICYLE ELECTRONIC SYSTEM

FIELD OF INVENTION

What follows is a description of a method for electronically controlling a bicycle gearshift, in particular a method for carrying out a multiple gearshifting, as well as a bicycle electronic system.

BACKGROUND

A system for transmitting motion in a bicycle comprises a chain extending between toothed wheels associated with the crank axle and with the hub of the rear wheel. When there are more than one toothed wheel at least one of the crank axle and the hub of the rear wheel, a gearshift is provided comprising a chain guide element, also known as derailleur that moves the chain between the toothed wheels in order to change the gear ratio.

In the case of an electronically servo-assisted gearshift (electronic gearshift), the movement of the derailleur takes place through an electromechanical actuator, typically comprising an electric motor and an articulated parallelogram system. Control electronics drive the actuator automatically, for example based upon one or more detected variables such as travel speed, crank rotation speed, slope of the travel ground, cyclist's heart rate and similar, and/or based upon commands manually entered by the cyclist through suitable control members, for example levers or push buttons.

In order to change the gear ratio under certain conditions, the need may arise to carry out a multiple gearshifting, under this expression in the present disclosure and in the attached claims a gearshifting from an initial toothed wheel to a destination toothed wheel not immediately adjacent thereto being meant.

It is known that during a multiple gearshifting problems may arise if the derailleur and the chain are moved directly from the initial toothed wheel to the destination toothed wheel, caused i.a. by the particularly oblique configuration taken up by the chain and by the fact that, in passing directly from the initial toothed wheel to the destination toothed wheel, the chain does not correctly engage the intermediate toothed wheel(s), with a consequent reduction in the power transmitted by the transmission system to the rear wheel.

SUMMARY

In a first aspect, a method for carrying out a multiple gearshifting in a bicycle gearshift comprises the steps, repeated at least twice, of:
 a) transmitting a single gearshifting request from an electronic control unit,
 b) receiving the single gearshifting request in a driving unit,
 c) moving a chain of the gearshift between two adjacent toothed wheels through the driving unit to carry out a single gearshifting,
 and the step, carried out between two successive executions of step c), of:
 d) deliberately waiting for a waiting time,
 wherein the waiting step d) is carried out in the driving unit.
 In a second aspect, a bicycle electronic system comprises:
 an electronic control unit configured to transmit at least two single gearshifting requests to carry out a multiple gearshifting,
 a driving unit configured to receive said at least two single gearshifting requests and move a gearshift chain between two adjacent toothed wheels to carry out a single gearshifting as a consequence of having received each single gearshifting request,
 wherein said driving unit is configured to deliberately wait for a waiting time between movements of the gearshift chain as a consequence of having received successive single gearshifting requests of a multiple gearshifting.

In a third aspect, a method for electronically controlling a bicycle gearshift comprises the steps of:
 a) transmitting a gearshifting request from an electronic control unit,
 b) receiving the gearshifting request in a driving unit,
 c) moving a gearshift chain between two adjacent toothed wheels through the driving unit to carry out the gearshifting, and
 d) deliberately waiting for a waiting time,
 wherein the gearshifting request transmitted in step a) comprises a time value indicative of the waiting time, and the waiting step d) is carried out in the driving unit.

In a fourth aspect, a bicycle electronic system comprises:
 an electronic control unit configured to transmit a gearshifting request,
 a driving unit configured to receive the gearshifting request and move a gearshift chain between two adjacent toothed wheels to carry out the gearshifting,
 wherein the electronic control unit is configured to transmit within the gearshifting request a time value indicative of the waiting time, and the driving unit is configured to deliberately wait for the waiting time.

In a fifth aspect, a method for carrying out a multiple gearshifting in a bicycle gearshift comprises the step, repeated at least twice, of:
 a) moving a gearshift chain between two adjacent toothed wheels to carry out a single gearshifting,
 and the steps of:
 b) deliberately waiting for a waiting time between two successive executions of step a), and
 c) manually adjusting at least one time value indicative of the waiting time.

In a sixth aspect, a bicycle electronic system configured to move a gearshift chain between two adjacent toothed wheels to carry out a single gearshifting, and comprising a user interface,
 Wherein the system is configured to deliberately wait for a waiting time between successive movements of the chain of a multiple gearshifting,
 and the user interface is configured for manual adjustment of at least one time value indicative of the waiting time.

BRIEF DESCRIPTION OF THE DRAWINGS

The following detailed description refers to the attached drawings. In such drawings.

DETAILED DESCRIPTION OF THE PREFERRED EMBODIMENTS

Introduction

Figure 1:
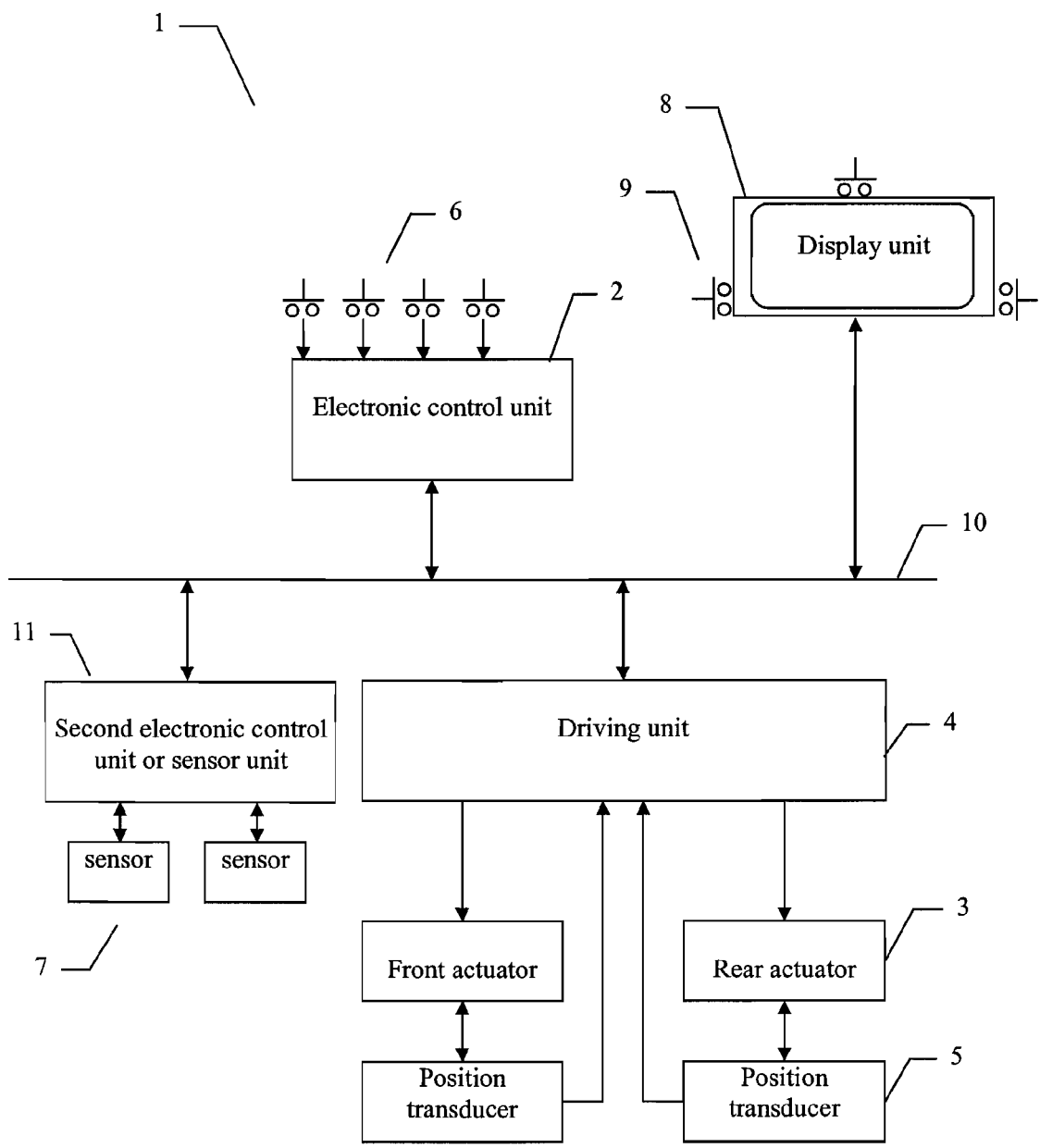
FIG. 1 shows a block diagram of a bicycle electronic system.

A method for carrying out a multiple gearshifting in a bicycle gearshift comprises the steps, repeated at least twice, of:

a) transmitting a single gearshifting request from an electronic control unit, b) receiving the single gearshifting request in a driving unit, c) moving a chain of the gearshift between two adjacent toothed wheels through the driving unit to carry out a single gearshifting, and the step, carried out between two successive executions of step c), of:

d) deliberately waiting for a waiting time, wherein the waiting step d) is carried out in the driving unit.

As used herein, deliberately wait means to actively monitor the passing of a time period, as opposed to waiting for an uncontrolled time that naturally ensues from the wait for a given event.

By providing for the wait, which allows the secure engagement of the chain with the destination toothed wheel and also with the or every intermediate toothed wheel while a multiple gearshifting is carried out, to be carried out in the driving unit, the computing capability of the electronic control unit is not affected by the management of the wait, and the electronic control unit is free to carry out other functions, for example the management of errors of the electronic system, communication with a display unit or various sensors of the electronic system, etc.

The method may further comprise the step of:

e) transmitting a successful single gearshifting signal from the driving unit to the electronic control unit.

Step d) of waiting for a waiting time can be carried out after step c) of moving the chain. In other words, the driving unit immediately executes each single gearshifting request and waits before executing a possible further single gearshifting request during the course of a multiple gearshifting.

However, the waiting step may be carried out before the first execution of the step of moving the chain, in other words step d) of waiting for a waiting time precedes step c) of moving the chain.

In this way it may be easier to determine the length of the waiting time by the electronic control unit; moreover, the possible successful single gearshifting signal can be immediately transmitted to the electronic control unit, which is therefore immediately updated on the current gear ratio.

The step a) of transmitting a single gearshifting request may comprise transmitting from the electronic control unit to the driving unit a data packet containing a time value indicative of the waiting time.

In this way, the value of the waiting time is established by the electronic control unit.

Transmission step a) and/or step e) of transmitting a successful single gearshifting signal can also take place through a wireless communication channel.

However, transmission step a) and/or step e) of transmitting a successful single gearshifting signal may take place through a communication channel via cable.

Transmission step a) and/or step e) of transmitting a successful single gearshifting signal may take place through a half duplex asynchronous serial communication protocol.

The data packet may be transmitted at least a second time.

The multiple sending of the data packet can allow the frequency of checking the communication channel by the driving unit and the possible communication errors to be reduced, especially in the case of wireless communication.

The time distance between the sending of one packet and the next one in a multiple sending may be between 10 ms and 120 ms, or preferably between 30 ms and 70 ms, or even more preferably 50 ms.

The data packet may be transmitted with a predetermined repetition frequency until receipt of the successful single gearshifting signal.

The time value indicative of the waiting time can coincide with the waiting time.

Alternatively, the time value indicative of the waiting time can be a desired total time to complete a single gearshifting, the step of:

f) calculating, in the driving unit, the waiting time by subtracting an estimated time to carry out a single gearshifting from the time value indicative of the waiting time being provided.

The method can therefore be parametrically implemented, so that changes in the time to carry out a single gearshifting, for example caused by changes of mechanical resistances, replacements of the actuator used or of the set of toothed wheels, etc., can easily be taken into consideration by the driving unit.

The estimated time to carry out a single gearshifting may be variable, for example it may be calculated by the driving unit itself based upon the times to carry out the previous gearshiftings, as a moving average.

Step a) may be carried out as a consequence of a step of:

g) receiving a manual gearshifting request from the user.

Alternatively or in addition, the method can comprise the step of h) detecting travel parameters and generating the gearshifting request based upon the detected travel parameters.

The waiting time may be between 0 ms and 500 ms.

The waiting time waited in step d) carried out before the first execution of step c) may be comprised between 0 ms and 50 ms or preferably between 0 ms and 10 ms.

In this way, when the wait is carried out before carrying out the gearshifting, the response speed of the electronic system is maximized, the delay provided to allow the secure engagement of the chain on the toothed wheel being effectively only inserted between two successive single gearshiftings of a multiple gearshifting.

Moreover, the waiting time waited in step d) associated with a single gearshifting following the first single gearshifting of a multiple gearshifting may be comprised between 50 ms and 500 ms, or preferably between 200 ms and 400 ms, even more preferably 300 ms.

Similar values shall be considered in the case of the first single gearshifting should the step d) of waiting be carried out after step c) of moving the chain.

The waiting time associated with different single gearshiftings of a multiple gearshifting can be different.

In this way it is possible to reduce the risk of the driving unit processing a same data packet indicative of a same single gearshifting request twice.

To the same end, a unique identifier, or a reference corresponding to the starting or destination toothed wheel, may be associated with each data packet.

Alternatively or in addition, the waiting time can be a function of the direction of gearshifting, of the derailleur, of the specific starting toothed wheel and/or of the specific destination toothed wheel.

The method may further comprise the step of:

i) manually adjusting at least one time value indicative of the waiting time and/or an estimated time to carry out a single gearshifting.

In an embodiment, manual adjustment step i) comprises increasing or decreasing the at least one time value and/or the estimated time to carry out a single gearshifting by a comparatively small amount at a time.

Said comparatively small amount may have an absolute value of 2 ms.

In this way it is possible to carry out a fine adjustment of the or each waiting time and/or of the estimated time to carry out a single gearshifting.

In the manual adjustment step i) a minimum value and/or a maximum value of the at least one time value and/or of the estimated time to carry out a single gearshifting may be provided.

In another embodiment, manual adjustment step i) comprises selecting between a predetermined number of alternatives of the at least one time value and/or of the estimated time to carry out a single gearshifting.

In the case of the waiting time waited in step d) associated with a single gearshifting following the first single gearshifting of a multiple gearshifting, the alternatives may comprise a first value equal to 500 ms, corresponding to a low multiple shifting speed, a second value equal to 350 ms, corresponding to a medium multiple shifting speed, or a third value equal to 50 ms, corresponding to a high multiple shifting speed.

Similar values shall be considered in the case of the first single gearshifting should the step d) of waiting be carried out after step c) of moving the chain.

The method may further comprise a step, following the manual adjustment step i), of:

j1) storing for later use the at least one adjusted time value and/or the adjusted estimated time to carry out a single gearshifting.

Alternatively, the method further comprises a step, following the manual adjustment step i), of:

j2) returning to a previously adjusted value of the at least one time value and/or of the estimated time to carry out a single gearshifting.

Still alternatively, the method may further comprise a step, following the manual adjustment step i), of:

j3) returning to a default value of the at least one time value and/or of the estimated time to carry out a single gearshifting.

The method may further comprise the step of:

k) selecting for use a default value of the at least one time value and/or of the estimated time to carry out a single gearshifting or a previously adjusted value of the at least one time value and/or of the estimated time to carry out a single gearshifting.

Step k) of selecting for use may be carried out upon switching the electronic system on.

One or more of the steps j1), j2), j3) and/or k) may be carried out in the electronic control unit and the method may further comprise the step of:

l) transmitting the default or adjusted, respectively, at least one time value and/or estimated time to carry out a single gearshifting to other units of the electronic system.

A bicycle electronic system comprises:

an electronic control unit configured to transmit at least two single gearshifting requests to carry out a multiple gearshifting, a driving unit configured to receive the at least two single gearshifting requests and move a gearshift chain between two adjacent toothed wheels to carry out a single gearshifting as a consequence of having received each single gearshifting request, wherein the driving unit is configured to deliberately wait for a waiting time between movements of the chain as a consequence of having received successive single gearshifting requests of a multiple gearshifting.

The system may further comprise at least one actuator associated with a chain guide element intended to move a motion transmission chain between toothed wheels associated with the crank axle and/or with the hub of the rear wheel of the bicycle, the driving unit being configured to drive the at least one actuator.

The at least one actuator may comprise an electric motor coupled with an articulated parallelogram.

The electric motor may be a stepper motor.

Alternatively, other types of motors or actuators can be used, for example a rack and pinion system or a worm gear system.

The system may further comprise at least one position transducer and the driving unit may be configured to transmit a successful single gearshifting signal to the electronic control unit when the at least one position transducer indicates that the chain is at a destination toothed wheel of the adjacent toothed wheels.

The driving unit can be configured to wait for the waiting time after the movement of the chain.

However, the driving unit may be further configured to wait for the waiting time prior to the movement of the chain.

The electronic control unit may be configured to transmit the gearshifting request through a data packet containing a time value indicative of the waiting time.

The electronic control unit and the driving unit can be in wireless communication.

However, the system may comprise a communication channel via cable between the electronic control unit and the driving unit.

Moreover, the electronic control unit and the driving unit may communicate through a half duplex asynchronous serial communication protocol.

Further, the electronic control unit may be configured to transmit the data packet at least a second time.

The time distance between the sending of one packet and the next one in a multiple sending may be between 10 ms and 120 ms, or preferably between 30 ms and 70 ms, even more preferably 50 ms.

The electronic control unit may be configured to transmit the data packet with a predetermined repetition frequency until receipt of the successful single gearshifting signal.

The time value indicative of the waiting time can coincide with the waiting time.

Alternatively, the time value indicative of the waiting time can be a desired total time to complete a single gearshifting, the driving unit being configured to calculate the waiting time by subtraction of an estimated time to carry out a single gearshifting from the time value.

The driving unit may comprise means for calculating the value of the estimated time to carry out a single gearshifting.

The system can comprise manual actuation members to cause the transmission of the single gearshifting request.

Alternatively or in addition, the bicycle electronic system can comprise travel parameter sensors, the electronic control unit generating the single gearshifting request based upon the outputs of the sensors.

The system may further comprise a user interface.

The interface may be configured for manual adjustment of at least one time value indicative of the waiting time and/or of an estimated time to carry out a single gearshifting.

In an embodiment, the interface is configured to allow the at least one time value and/or the estimated time to carry out a single gearshifting to be increased or decreased by a comparatively small amount at a time.

The comparatively small amount may have an absolute value of 2 ms.

The interface may be configured to set a minimum value and/or a maximum value of the at least one time value and/or of the estimated time to carry out a single gearshifting.

In another embodiment, the interface is configured to allow the selection between a predetermined number of alternatives of the at least one time value and/or of the estimated time to carry out a single gearshifting.

The system may comprise a static memory and a volatile memory internal to the electronic control unit, and a static memory external to the electronic control unit.

The internal static memory may store a default value of the at least one time value and/or of the estimated time to carry out a single gearshifting.

The internal static memory may be a flash memory.

The volatile memory may store a current value of the at least one time value and/or of the estimated time to carry out a single gearshifting.

The volatile memory may be a RAM memory.

The external static memory may store a value set by the user of the at least one time value and/or of the estimated time to carry out a single gearshifting.

The external static memory may be an EEPROM memory.

The system may comprise selective copying means among the internal static memory, volatile memory and external static memory.

As far as the various time values are concerned, what has been outlined with reference to the method applies.

A method for electronically controlling a bicycle gearshift comprises the steps of:
 a) transmitting a gearshifting request from an electronic control unit,
 b) receiving the gearshifting request in a driving unit,
 c) moving a gearshift chain between two adjacent toothed wheels through the driving unit to carry out the gearshifting, and
 d) deliberately waiting for a waiting time,
 wherein the gearshifting request transmitted in step a) comprises a time value indicative of the waiting time, and the waiting step d) is carried out in the driving unit.

Characteristics of such a method are analogous to what has been described above.

A bicycle electronic system comprises:
 an electronic control unit configured to transmit a gearshifting request,
 a driving unit configured to receive the gearshifting request and move a gearshift chain between two adjacent toothed wheels to carry out the gearshifting,
 wherein the electronic control unit is configured to transmit within the gearshifting request a time value indicative of the waiting time, and the driving unit is configured to deliberately wait for the waiting time.

Characteristics of such a system are analogous to what has been described above.

A method for carrying out a multiple gearshifting in a bicycle gearshift comprises the step, repeated at least twice, of:
 a) moving a gearshift chain between two adjacent toothed wheels to carry out a single gearshifting,
 and the steps of:
 b) deliberately waiting for a waiting time between two successive executions of step a), and
 c) manually adjusting at least one time value indicative of the waiting time.

Characteristics of such a method are analogous to what has been described above.

A bicycle electronic system is configured to move a gearshift chain between two adjacent toothed wheels to carry out a single gearshifting, and comprises a user interface, wherein the system is configured to deliberately wait for a waiting time between successive movements of the chain of a multiple gearshifting, and the interface is configured for manual adjustment of at least one time value indicative of the waiting time.

Characteristics of such a system are analogous to what has been described above.

Description

With reference to FIG. 1, a bicycle electronic system 1 according to an embodiment generally comprises an electronic control unit 2, at least one actuator 3 associated with a chain guide element or derailleur intended to move a chain for transmitting motion among toothed wheels associated with the crank axle and/or with the hub of the rear wheel of the bicycle, and a driving unit 4 of the actuator(s) 3.

Said at least one actuator 3 can for example comprise an electric motor, preferably a stepper motor, coupled with an articulated parallelogram, but other types of motor or other types of actuator well known in the art can be used, for example a rack and pinion system or a worm gear system, for example the one described in U.S. Pat. No. 6,679,797, herein incorporated by reference.

The bicycle electronic system 1 preferably further comprises at least one position transducer 5 suitable for detecting the position of the actuator 3 and therefore indirectly of the derailleur, or for directly detecting the position of the derailleur, to cooperate with the driving unit 4 and/or with the actuator 3 itself in moving the derailleur.

In the bicycle electronic system 1, the electronic control unit 2 has a plurality of switches 6 of the normally open type associated therewith, actuated by the cyclist through levers or buttons to input manual gearshifting requests and/or one or more sensors 7 of travel parameters, such as travel speed, cranks rotation speed, slope of the travel ground, cyclist's heart rate and similar, from which the electronic control unit 2 derives a desired gear ratio and therefore the advisability of carrying out a gearshifting. The sensors 7, where provided for, are preferably under the control of a second electronic control unit 11, which can provide for pre-processing their outputs. Alternatively, the sensors 7 could be under the direct control of the electronic control unit 2 or even under the control of the driving unit 4 or of the display unit 8.

The normally open switches 6 can of course be replaced by normally closed switches or by selector switches.

The bicycle electronic system preferably further comprises a display unit 8 for providing the cyclist with information, with which further switches 9 are preferably associated, actuated by the cyclist through buttons or a multi-direction button (joystick) to select the type of data to be displayed and/or to input other parameters and/or commands, preferably by selecting areas of the display of the display unit 8 in the manner of a graphical user interface. Alternatively, the display unit 8 can be a touch screen. The display unit 8 can comprise its own logic unit suitable for managing the information displayed and for managing the communication with the other components of the system, in particular with the electronic control unit 2.

The electronic control unit 2 is preferably positioned close to the cyclist actuatable command members, namely close to the handlebars, in particular it can be housed in the casing of the display unit 8 fixed to the centre of the handlebars.

The driving unit 4 is preferably positioned close to the actuators 3, for example close to a bottle-holder of the bicycle.

The electronic control unit 2 and the driving unit 4 communicate through a communication channel 10.

Communication is preferably via cable, but alternatively communication can be a radio transmission (wireless).

The display unit 8 and the second electronic control unit or sensor unit 11, where provided for, also preferably communicate through the same communication channel and the same communication protocol.

More specifically, in the case of half duplex asynchronous serial communication, the communication channel in practice comprises two common signal lines "Tx/Rx" and "WU," to which the electronic control unit 2 and the driving unit 4, as well as the possible other units 8, 11, are connected to form a communication network.

The signal line Tx/Rx is a receiver/transmitter line for a bi-directional transmission of the data between the various components 2, 4, 8, 11, while the signal line WU is a status line with two values used for the communication protocol. For example, logic value "0" of the status line WU indicates that the transmission line Tx/Rx is busy, and logic value "1" of the status line WU indicates that the transmission line Tx/Rx is available for a communication process.

When one of the units 2, 4, 8, 11, or sender, has something to transmit to another of the units 2, 4, 8, 11, or recipient, it checks whether the transmission line Tx/Rx is busy or available by reading the value of the status line WU. If the value of line WU indicates that the transmission line Tx/Rx is busy (WU=0), the sender waits until the value of line WU indicates that the line Tx/Rx has become available (WU=1). As soon as the transmission line Tx/Rx is available, the sender switches the status of the status line WU, taking it to "0" to occupy the communication network.

The sender then transmits a packet of serial data on the transmission line Tx/Rx.

Each data packet comprises one or more header bytes depending upon the communication protocol used, and one or more data bytes.

There can also be data for checking the transmission, for example parity or check-sum bit(s).

The header bytes comprise the indication of the instructions that must be carried out by the recipient, such information being defined in terms of a code that also encodes the recipient itself, as well as the address of the sender.

The data bytes depend, in length, structure and content, upon which unit 2, 4, 8, 11 is the sender, upon which unit 2, 4, 8, 11 is the recipient, and upon the type of information that is transmitted.

When the status line WU is taken to "0" by the sender, the units 2, 4, 8, 11 connected in network begin to read the packet of serial data sent by the sender along the transmission line Tx/Rx. The unit 2, 4, 8, 11 that recognizes to be the recipient of the transmission, through decoding of the header byte(s) of the data packet, becomes the recipient and can answer by transmitting on the transmission line Tx/Rx a packet of serial data indicative of an acknowledgement of receipt intended for the current sender. The other units 2, 4, 8, 11 connected to the network, except for the sender and the recipient, are not involved in the transmission process and can perform other activities.

At the end of the transmission from the recipient to the sender, the sender changes the status line WU to "1" thus releasing the communication network. In the case in which none of the units 2, 4, 8, 11 connected to the network replies to the sender, for example in the case of failure of the recipient, the sender releases the network after a predetermined time out, taking the status line WU to "1."

The described half duplex asynchronous serial communication is a "random access multi-master communication system," where the exclusive use of the network is carried out by the first "sender" unit 2, 4, 8, 11 that requires the network.

If more than one unit 2, 4, 8, 11 require the use of the network simultaneously, the exclusive use of the network is hierarchically established through a priority defined by the firmware of the various units 2, 4, 8, 11.

This occurs, for example, when two or more units 2, 4, 8, 11 have something to transmit while the network is busy (status line WU="0") so that they must wait until the network is again available. At the moment when the network is again available (the status line WU is taken to "1"), the two or more units are all ready to occupy the network, and only the unit with the highest hierarchical order becomes the sender.

As an alternative to the half duplex asynchronous serial communication described above, between the units 2, 4, 8, 11 a synchronous serial, duplex asynchronous serial, CAN, Ethernet or similar communication, could be established, through a suitable communication channel.

The operation of the bicycle electronic system 1 shall be described hereinafter with reference to FIGS. 2 and 3, which show block diagrams respectively relating to the electronic control unit 2 and to the driving unit 4.

In a block 101, the electronic control unit 2 establishes whether a gearshifting is necessary. In the case of exclusively manual operation of the electronic system 1 or in the case of a manual operating mode, step 101 of establishing whether a gearshifting is necessary takes place through the detection of the switching of status, typically of the closing, of one of the normally open switches 6, caused by the actuation of the lever or button associated therewith. In the case of exclusively automatic operation of the electronic system 1 or in the case of an automatic operating mode, step 101 of establishing whether a gearshifting is necessary takes place in a way that is well known per se in the art based upon the data detected through the sensors 7. For example, a gearshifting request can be generated based upon the bicycle speed detected by a speed sensor. In the case of exclusively semiautomatic operation of the electronic system 1 or in the case of a semiautomatic operating mode, step 101 of establishing whether a gearshifting is necessary takes place both through detecting the switching of status, typically closing, of one of the normally open switches 6, and based upon the signals coming from the sensors 7. In the latter case, the fulfillment of a manual gearshifting request can be subordinated to checking the data detected through the sensors 7, or vice-versa a manual gearshifting request can take priority over the evaluation of the data detected through the sensors 7.

If in block 101 the electronic control unit 2 establishes that a gearshifting is not necessary, it passes to performing other functions—block 102—, for example to management of errors, to communication with the display unit 8, to reading the signals coming from the sensors 7 through the second electronic control unit 11 etc. It is worthwhile highlighting that the shown sequential nature between blocks 101 and 102 is purely illustrative: in an event-driven embodiment of the electronic system 1, the positive check of block 101 can for example consist of an interrupt generated at the switching of status of the switch 6.

If, on the other hand, in block 101 the electronic control unit 2 establishes that a gearshifting is necessary, which as shall become clear hereinafter can be a first single gearshifting of a multiple gearshifting, in a block 103 the electronic control unit 2 generates a data packet P1—block 103—and transmits it to the driving unit 4 on the communication channel 10—block 104. The transmission of the data packet P1 can optionally be repeated cyclically—block 105—, for example every 50 ms. More generally, the repetition interval can be between 10 ms and 120 ms, preferably between 30 ms and 70 ms.

In the header byte(s) of the data packet P1, the gearshifting request and the type of gearshifting are encoded—i.e. whether it is an upward or downward gearshifting and whether it refers to the front or rear derailleur where they are both present. The data byte(s) of the data packet P1 contain(s) a time value T, which meaning shall become clear hereinafter.

Figure 3:
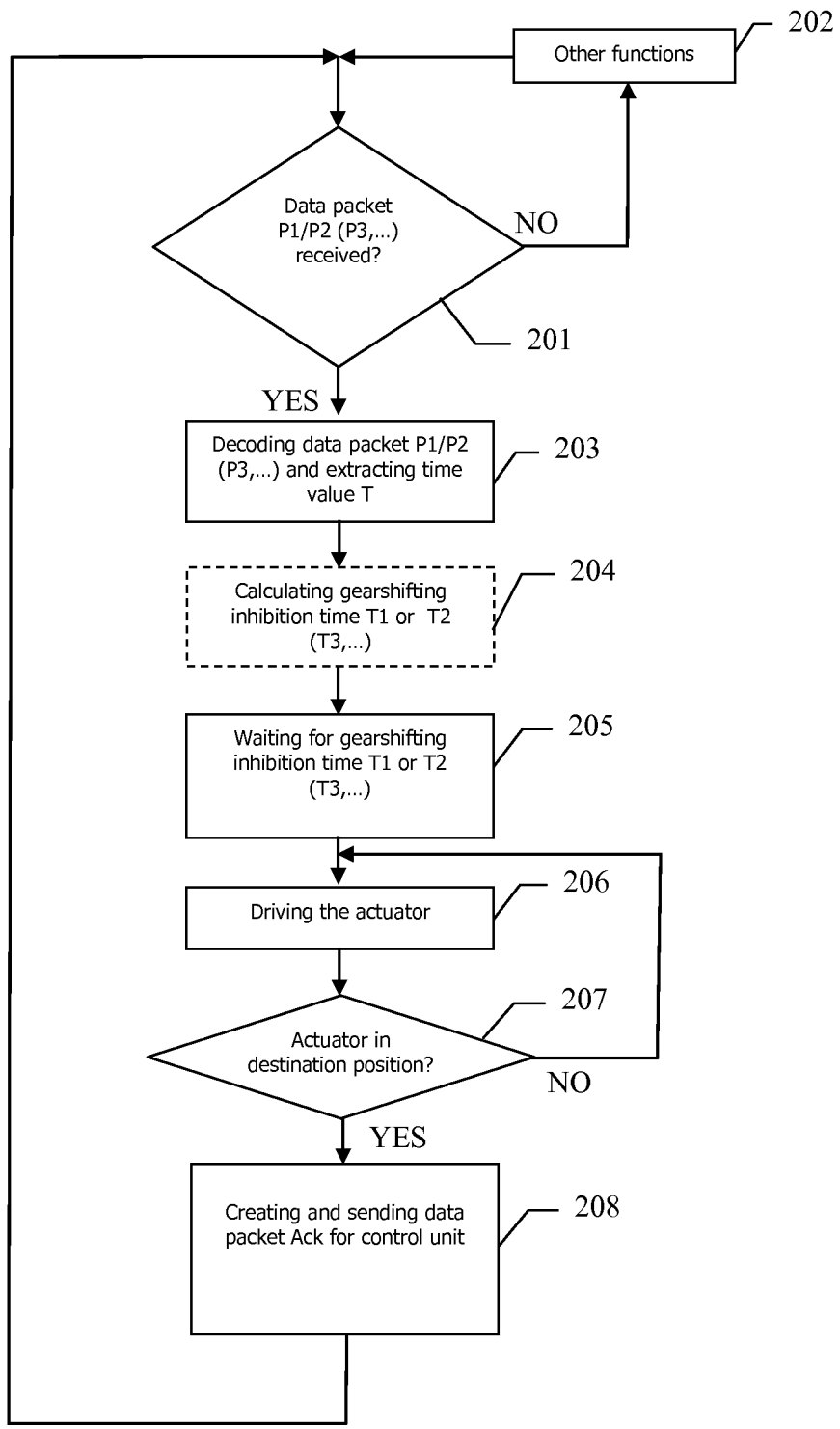
FIG. 3 shows a block diagram of the operation of a driving unit of the system of FIG. 1.

With reference to FIG. 3, the driving unit 4 monitors the receipt of the data packet P1—block 201—, performing other functions—block 202—, for example checking the signals coming from the transducer(s) 5, indicative of possible undesired movements of the actuator, until receipt of the data packet P1.

When the driving unit 4 receives the data packet P1—block 201—, it decodes the information encoded therein—block 203—, taking out the time value T.

In an embodiment, the time value T contained in the data byte(s) of the data packet P1 is a desired waiting time T1 that the driving unit 4 must let lapse without carrying out the single gearshifting. During the course of a multiple gearshifting, the waiting time T1 lapses, as shall be understood, between the completion of a single gearshifting and the start of another single gearshifting.

In another embodiment, the time value T contained in the data byte(s) of the data packet P1 is a desired total time to carry out the single gearshifting, in other words, during the course of a multiple gearshifting, the desired total time between the completion of a single gearshifting and the completion of another single gearshifting.

In the case of this second embodiment, the driving unit 4 knows the estimated time Ts to carry out a single gearshifting, for example stored in a memory location, and calculates—block 204—a waiting time T1 as the difference between the time value T decoded by the data packet P1 and the estimated time Ts to carry out a single gearshifting. The estimated time Ts to carry out a single gearshifting can be fixed or calculated by the driving unit 4 itself based upon the times taken to carry out the previous gearshiftings—for example a moving average.

In both embodiments, the driving unit 4 therefore waits—block 205—for a time equal to the waiting time T1, decoded or calculated, respectively.

After the waiting time T1, the driving unit 4 actuates—blocks 206, 207—the single upward or downward gearshifting, of the front or rear derailleur, in accordance with what has been decoded from the header byte(s) of the data packet P1.

More specifically, according to the block diagram of FIG. 3, to carry out the gearshifting the driving unit 4 sends—block 206—a driving signal, in one direction or in the opposite one, to the front or rear actuator 3 until it checks—block 207—that the position of the derailleur—or the position of the actuator 3 and therefore indirectly of the derailleur—, detected through the position transducer 5, corresponds with the desired destination position, in other words at the immediately adjacent toothed wheel.

In another embodiment, the driving of the actuator 3 can take place with the sending of a driving signal of predetermined magnitude or duration, thereafter checking the position of the actuator 3 detected by the position transducer 5 and possibly generating a further driving signal of the actuator 3 in case a correction of the position of the actuator 3 and therefore indirectly of the derailleur is necessary.

In yet another embodiment, wherein the electronic system 1 lacks transducers 5, the driving of the actuator 3 can take place simply with the sending of a driving signal of predetermined magnitude or duration, without any check that the actuator 3 and therefore indirectly the derailleur have actually reached the desired position.

It should be noted that the estimated time Ts can in particular coincide with the powering time of the derailleur 3 during step 206.

Once the single gearshifting is complete—output yes from block 207—, the driving unit 4 immediately generates and sends on the communication channel a data packet Ack for the electronic control unit 2, encoding the completion of the single gearshifting—block 208.

Figure 2:
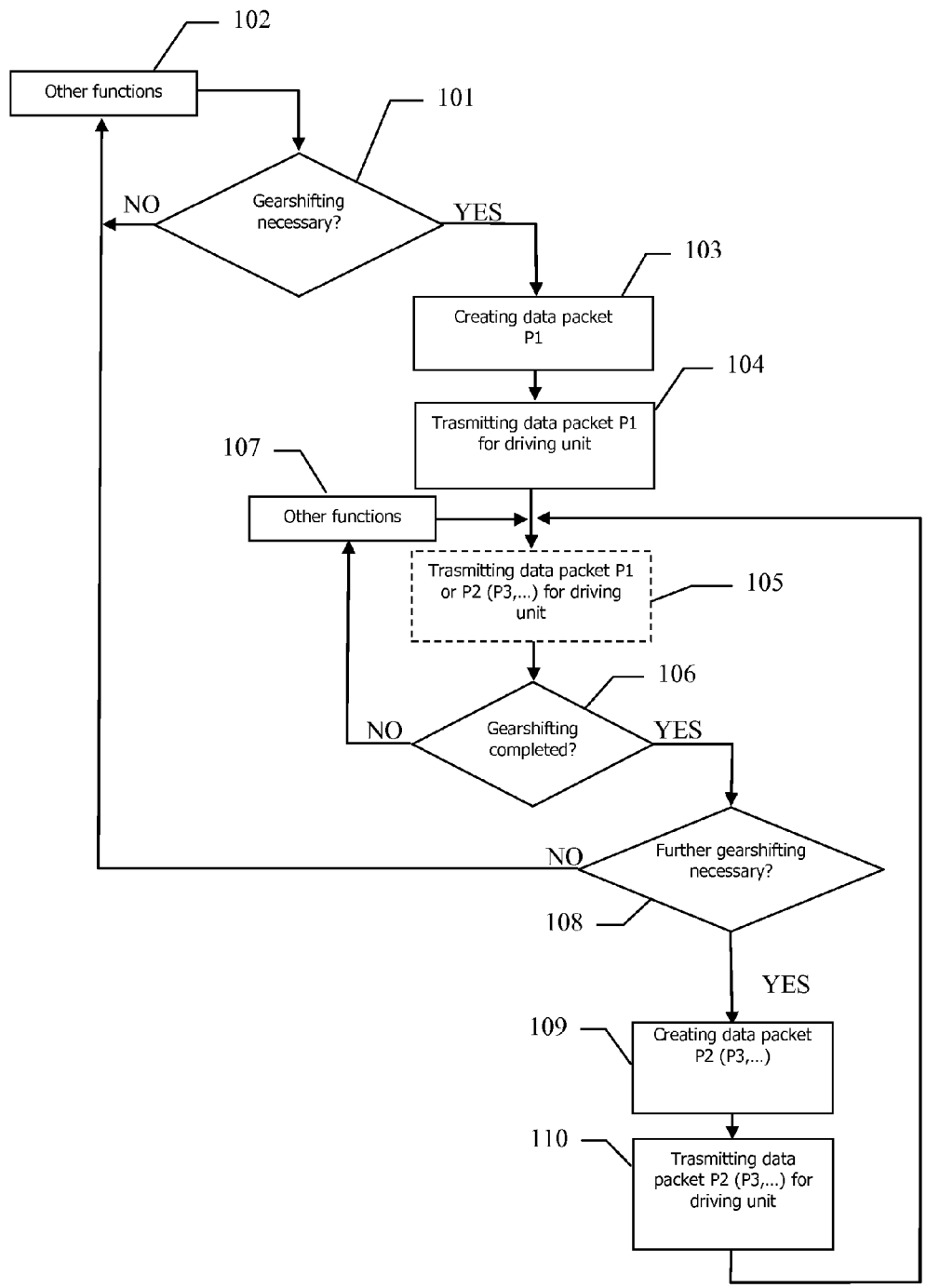
FIG. 2 shows a block diagram of the operation of an electronic control unit of the system of FIG. 1.

Going back to FIG. 2, the electronic control unit 2 receives—block 106—this data packet Ack and therefore detects the completion of the single gearshifting.

With a block 107 it is indicated that the electronic control unit 2 performs other functions until receipt of the data packet Ack—output yes of block 106, including the possible repeated sending of the data packet P1—block 105. The shown sequential nature among blocks 105-107 is also purely illustrative: in an event-driven embodiment of the electronic system 1, the positive check of block 106 can for example consist of an interrupt.

As soon as the electronic control unit 2 detects the completion of the single gearshifting—output yes from block 106—, in a block 108 it establishes whether a further gearshifting is necessary, totally analogously to what has been described above with reference to block 101. More specifically, in the case of manual operation or operating mode, step 108 of establishing whether a further gearshifting is necessary takes place through detecting that the status of the switch 6 still corresponds with the gearshifting request, for example because the cyclist is exerting a prolonged pressure on the lever or button associated with the switch 6, or he/she has pressed it a second time in quick succession after the first time. In the case of automatic or semiautomatic operation or operating mode of the electronic system 1 or in the case of an automatic operating mode, the electronic control unit 2 will have established—beforehand in block 101 or during the performance of the other functions in block 107—whether a single gearshifting was necessary, and therefore the check of block 108 shall have a negative outcome, or a multiple gearshifting was necessary, and therefore the check of block 108 shall have a positive outcome.

If the check of block 108 has a negative outcome, the single gearshifting has ended and the electronic control unit 2 goes back to performing its functions—blocks 101 and 102—, including monitoring the manual gearshifting requests and/or evaluating the advisability of changing the gear ratio.

If, on the other hand, the check of block 108 has a positive outcome, it is a multiple gearshifting and therefore at least one further single gearshifting is necessary. In this case, the electronic control unit 2 generates a data packet P2—block 109—and transmits it to the driving unit 4—block 110. The data packet P2 is analogous to the data packet P1 generated in block 103, but it encodes a time value T preferably larger than the data packet P1.

The behavior of the driving unit 4 totally corresponds to what has been described relative to the data packet P1.

When the driving unit 4 receives the data packet P2—block 201—or the first of the data packets P2 in the case of a multiple sending, it decodes it—block 203—, taking out the time value T.

Similarly to the data packet P1, the time value T contained in the data byte(s) of the data packet P2 is a desired waiting time T2 between the completion of a single gearshifting and the start of another single gearshifting during the course of a multiple gearshifting, or a desired total time between the completion of one single gearshifting and the completion of another single gearshifting during the course of a multiple gearshifting.

The driving unit 4 thus waits—block 205—for a time equal to the waiting time T2 decoded from the data packet P2, or calculated in block 204 as the difference between the time value T decoded from the data packet P2 and the estimated time Ts to carry out a single gearshifting.

After the waiting time T2, the driving unit 4 actuates—blocks 206, 207—the single upward or downward gearshifting, of the front or rear derailleur, in accordance with what has been decoded from the header byte(s) of the data packet P2.

Once the second single gearshifting is complete—output yes from block 207—, the driving unit 4 immediately generates and sends on the communication channel a second data packet Ack for the electronic control unit 2, encoding the completion of the single gearshifting—block 208.

As soon as the electronic control unit 2 detects the completion of the second single gearshifting—block 106—, in block 108 it establishes whether a further (third) gearshifting is necessary as described above. If the check of block 108 has a negative outcome, the multiple gearshifting (double gearshifting) has ended and the electronic control unit 2 goes back to performing its own functions—blocks 101 and 102.

If, on the other hand, the check of block 108 has a positive outcome, it is at least a triple gearshifting and the electronic control unit 2 generates a data packet P3—block 109—and transmits it to the driving unit 4—block 110—, which processes it in a manner totally corresponding to what described relative to the data packets P1 and P2. The above described operating cycle is repeated until completion of the multiple gearshifting.

The data packet P3, . . . is analogous to the data packets P1 and P2 and encodes a time value T preferably larger than the data packet P1, not necessarily distinct from the time value encoded in the data packet P2.

With the method described above, before starting each successive single gearshifting of a multiple gearshifting, with the movement of the actuator 3 of the derailleur, a waiting time T2, T3, . . . is introduced by the driving unit 4. During such a waiting time T2, T3, . . . , the actuator 3 is still and the chain manages to engage the toothed wheel and to ensure a secure gearshifting before it is moved for a subsequent single gearshifting of a multiple gearshifting. The waiting time T1 introduced before the first single gearshifting, on the other hand, is preferably minimized, possibly even equal to zero, in which case no actual delay is introduced. Indeed, the bicycle electronic system 1 is desired to immediately react to the first actuation of the gearshifting lever or button by the cyclist, or as soon as the electronic control unit 2 considers it advisable.

It should be noted that the optional multiple sending of the data packet P1, P2 (, P3 . . . ) by the electronic control unit 2—block 105—can allow the frequency of check of the communication channel by the driving unit 4 and the possible communication errors to be reduced, especially in the case of wireless communication. In any case, the driving unit 4 processes just one of the data packets P1, P2 . . . . Indeed, block 201 is again carried out only after the data packet Ack of successful gearshifting has been sent, as a consequence of which the electronic control unit 2 stops sending the data packet P1, possibly sending the data packet P2 (P3, . . . ).

In order to further reduce the risk of the driving unit 4 processing the same data packet P1, P2 (, P3 . . . ) twice, it is also possible to consider that the time values T encoded in distinct data packets never coincide, for example increasing the time value T in each new data packet generated by the electronic control unit 2 even only by one millisecond. In this case, the driving unit 4 shall ignore data packets in which there is a time value T identical to that of the data packet just processed.

To the same purpose, alternatively it can be provided to associate a unique identifier, or a reference to the starting or destination toothed wheel, with each data packet P1, P2 (, P3 . . . ). In the case of a rear gearshift group with eleven toothed wheels, for example, four bits could be sufficient to encode the toothed wheel.

The waiting time values T1, T2, T3, . . . and therefore the time values T transmitted in each data packet P1, P2, P3 . . . are suitably selected.

For example, the waiting time T1 introduced before the first single gearshifting can be selected as 0 ms as stated above, or 10 ms and therefore the time value T transmitted in the first data packet P1 can be 0 ms or 10 ms, respectively, in case it represents the desired time between the completion of a single gearshifting and the start of another single gearshifting during the course of a multiple gearshifting and the calculation step of block 204 is not carried out, or T can for example be 200 ms or 210 ms, respectively, in case it represents the desired total time between the completion of a single gearshifting and the completion of another single gearshifting during the course of a multiple gearshifting and the calculation step 204 is carried out, assuming an estimated time Ts to carry out a single gearshifting of 200 ms. The waiting time T2 introduced before the second single gearshifting can be selected for example as 300 ms and therefore the time value T transmitted in the second data packet P2 can be 300 ms in the absence of calculation step 204, or 500 ms in the presence of calculation step 204. The waiting time T3, . . . introduced before the further single gearshiftings can be selected, as stated above, equal to the waiting time T2 introduced before the second single gearshifting, namely 300 ms, or slightly above, even just equal to 301 ms, . . . and therefore the time value T transmitted in the third, . . . data packet P3, . . . can be 300 ms or 301, . . . ms in the absence of the calculation step 204, or 500 ms or 501, . . . ms in the presence of the calculation step 204.

More generally, the waiting time T1 can be comprised between 0 ms and 50 ms, more preferably between 0 and 10 ms.

The waiting time(s) T2, T3, . . . can be comprised between 50 and 500 ms, more preferably between 200 and 400 ms.

The estimated time Ts to carry out a single gearshifting depends upon the type of actuator 3 and upon its control. The value of 200 ms used in the above examples is purely indicative. In the case of the front actuator, the estimated time Ts can for example be about 350 ms, in the case of the rear actuator for example about 100 ms. As stated above, moreover, the estimated time Ts can be adjusted updating it based upon the real times of the previously carried out gearshiftings.

In another embodiment, waiting step 205 by the driving unit 4 for a waiting time T1, T2, T3, . . . can be carried out after the driving unit 4 has detected that the single gearshifting is complete—output yes from block 207—and before generating and transmitting the data packet Ack indicative thereof—block 208.

Waiting step 205 by the driving unit 4 for a waiting time T1, T2, T3, can also be carried out after the driving unit 4 has generated and transmitted the data packet Ack. In this case, if the driving unit 4 receives a further data packet P2, P3, . . . during the waiting time T1, T2, T3 . . . , it will suspend its processing until the end of the waiting time T1, T2, T3 . . . itself.

In the case of waiting after the actuation of the gearshifting, the waiting time T1 associated with the first single gearshifting is also selected of a suitable not null value, possibly equal to the next waiting time(s) T2, T3, . . . , to allow the secure engagement of the chain on the immediately adjacent toothed wheel, where it is immediately taken upon receipt of the first data packet P1.

In the case of a single gearshifting, the imposition of a waiting time T1 by the electronic control unit 2—through the transmission of the waiting time T1 or of the total time T corresponding to the sum of the waiting time T1 and of the estimated time Ts to carry out a gearshifting—allows the sending of the gearshifting request to the driving unit 4 to be advanced, thus freeing the electronic control unit 2 earlier. For example, the electronic control unit 2, in the case of exclusively automatic operation or in an automatic operating mode, could establish that the bicycle is accelerating considering it advisable to gearshift in a short time, but not immediately, and allocate to the driving unit 4 the time waiting prior to gearshifting (for example a few seconds). Again as an example, in the case of exclusively semiautomatic operation or in a semiautomatic operating mode, the electronic control unit 2 could establish that it is advisable to delay the actuation of a gearshifting request by the cyclist, to actuate it at an optimal speed calculated based upon the instantaneous acceleration at the moment of the manual request; also in this case the electronic control unit 2 can allocate to the driving unit 4 the time waiting prior to gearshifting.

Even more generally, the electronic control unit 2 could transmit to the driving unit 4 a request to carry out a gearshifting within the total time indicated by the time value T, the choice of the moment when to begin gearshifting, lasting substantially as the estimated time Ts to carry out a gearshifting, during such a time interval T being allocated to the driving unit 4, which in this case could also carry out two distinct waits, one before and one after the actuation of the gearshifting.

Therefore, it is worthwhile highlighting that the transmission of the time value T associated with the gearshifting request is also advantageous irrespective of the provision of multiple gearshiftings, namely even in the absence of the blocks 107-110 of FIG. 2.

The various time values considered in the bicycle electronic system 1 namely the waiting times T2, T3, . . . and possibly T1 directly transmitted as time value T in the absence of calculation step 204, or the time values T transmitted and/or the estimated time Ts to carry out a single gearshifting in the presence of the calculation step 204, can be a function of the direction of gearshifting, of the derailleur, of the specific starting toothed wheel and/or of the specific destination toothed wheel.

In these cases, the electronic control unit 2 will each time transmit to the driving unit 4 a suitable time value T, according to the specific gearshifting operation.

Moreover, the various time values considered in the bicycle electronic system 1, namely the waiting times T2, T3, . . . and possibly T1 directly transmitted as time value T in the absence of the calculation step 204, or the time values T transmitted and/or the estimated time Ts to carry out a single gearshifting in the presence of the calculation step 204, can be adjusted to take the preferences of the cyclist and mechanical variations of the bicycle transmission system, for example because of replacements of parts after wear or damage, into account.

The waiting time T1 possibly provided for before the first single gearshifting of a multiple gearshifting, namely when the waiting by the driving unit 4 takes place before the gearshifting is carried out, preferably cannot however be modified, since as stated above it is suitable for it to keep a low or zero value to maximize the speed of response of the bicycle electronic system 1.

Figure 4:
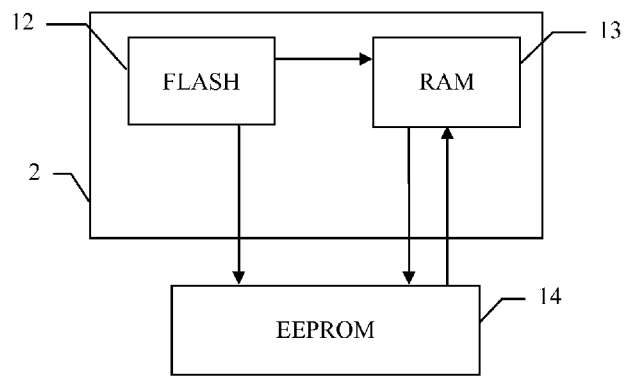
FIG. 4 shows a memory structure of the system of FIG. 1.

In order to allow such adjustment(s), the bicycle electronic system 1 can comprise, as shown in FIG. 4, a static memory 12, for example a flash memory, and a volatile memory 13, for example a RAM memory, internal to the electronic control unit 2, and a static memory 14, for example an EEPROM memory 13, external to the electronic control unit 2. In the case in which the estimated time Ts to carry out a single gearshifting is also adjustable, the driving unit 4 can have a similar memory structure or it can receive the value of the estimated time Ts or its default value in the case of adjustment based upon the real time of the previous gearshiftings, from the electronic control unit 2 through the communication channel 10.

In the static memory 12 the various default time values are stored at factory. In the volatile memory 13 the time values to be used to generate the data packets P1, P2 (P3, . . . ) during the use of the electronic system 1 are stored. In the static memory 14 the default time values are stored at the moment when it leaves the factory, and thereafter the time values set by the user as described hereinafter.

The adjustment of the time values takes place for example as described hereinafter with reference to FIG. 5.

The electronic system 1 for a bicycle displays—block 301—on the display unit 8, for example after one of the buttons 9 associated therewith has been pressed, a setting page of one of the time values, for example the waiting time T2 or a waiting time in the case of upward gearshifting or a waiting time in the case of downward gearshifting, and allows the user to adjust its value—block 302—through the buttons 9 associated with the display unit 8 or through other manual command members, for example the manual command members associated with the switches 6 and managed in a context sensitive manner, or one or more buttons provided on the command device carrying the manual command members associated with the switches 6, or also by pressing areas of a touch screen of the display unit 8. Hereinafter, exclusive reference to the buttons 9 associated with the display unit 8 will be made for the sake of brevity.

Figure 6:
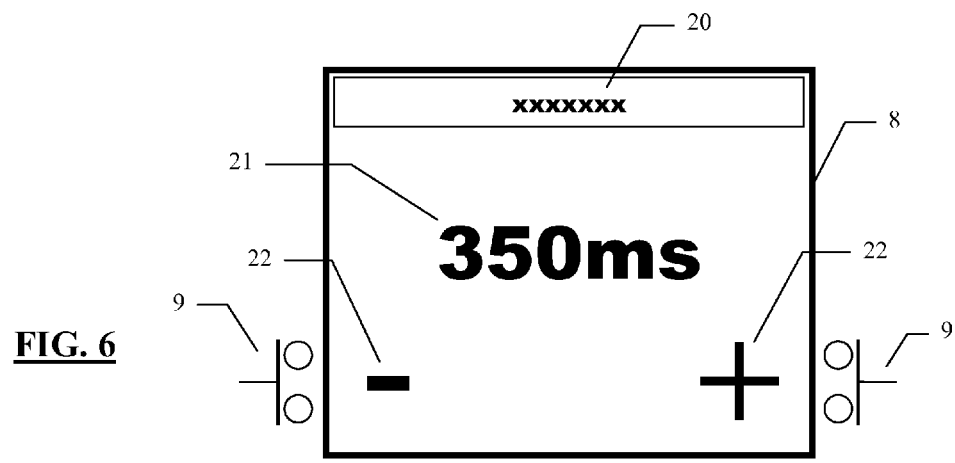
FIGS. 6 and 7 show examples of interfaces for adjusting time variables in the system of FIG. 1.

For example, the displayed page can have the appearance shown in FIG. 6, wherein the type of value being adjusted is shown in a title 20 and its current value is shown in a central area 21, initially read from the volatile memory 13, as well as two increase and decrease icons 22 cooperating with two of the buttons 9 associated with the display unit 8 to form a graphical user interface.

Figure 5:
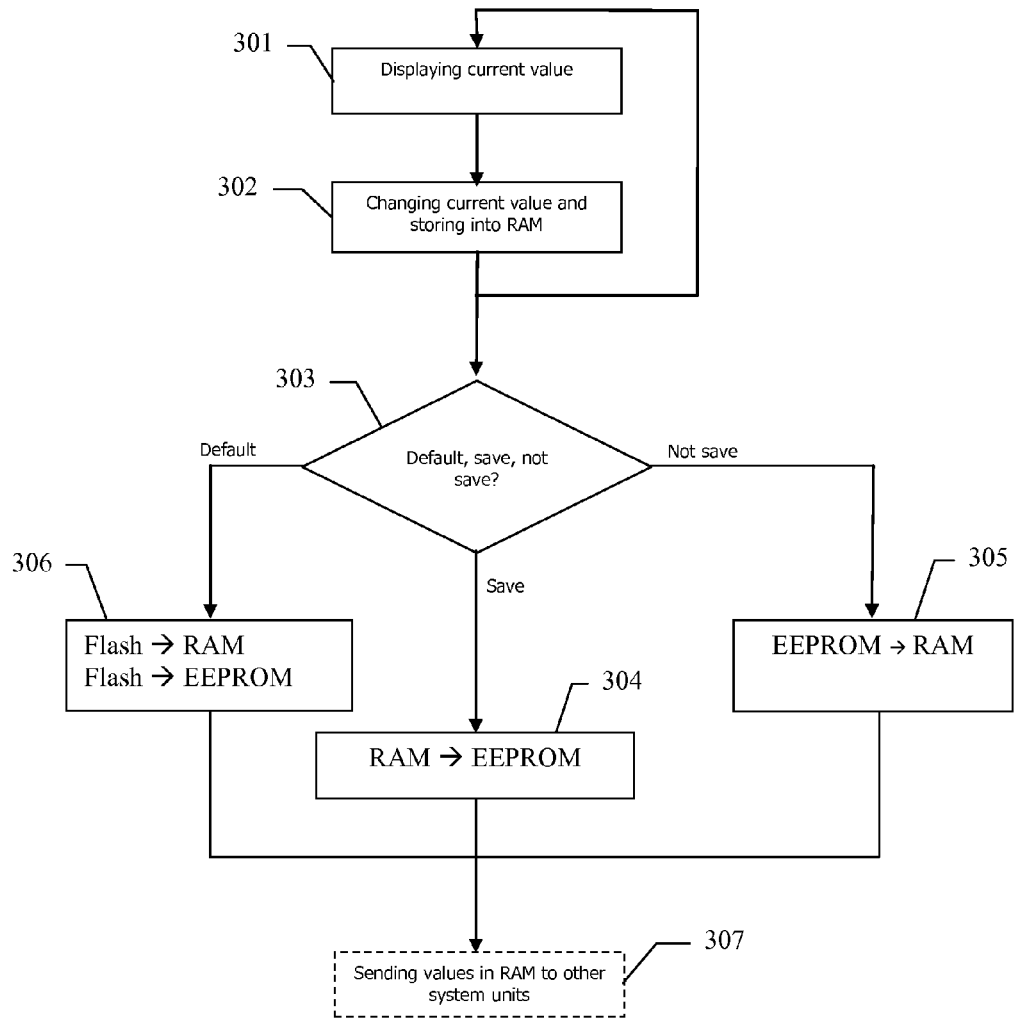
FIG. 5 shows a block diagram of operation for adjusting time variables in the system of FIG. 1.

Pressing the buttons 9 allows the value displayed in the central area 21 and stored in the volatile memory 13 to be respectively increased or decreased—block 302 of FIG. 5.

Preferably, each time the buttons 9 are pressed corresponds to a small change in the value displayed in the central area 21, for example by an absolute value of 2 ms. In this way it is possible for the user to perform a fine adjustment of the time value.

Preferably, a minimum value, for example 50 ms, and a maximum value, for example 500 ms, can also be provided for in the case of adjustment of the waiting time T2 (T3, ...) associated with the second (third, ...) single gearshifting.

In an alternative, the time value can be selected between a predetermined number of alternatives, for example three. In the case of adjustment of the waiting time T2 (T3, ...) associated with the second (third, ...) single gearshifting, for example, a first value equal to 500 ms, corresponding to a low multiple gearshifting speed, a second value equal to 350 ms, corresponding to a medium multiple gearshifting speed, or a third value equal to 50 ms, corresponding to a high multiple gearshifting speed can be provided for.

Figure 7:
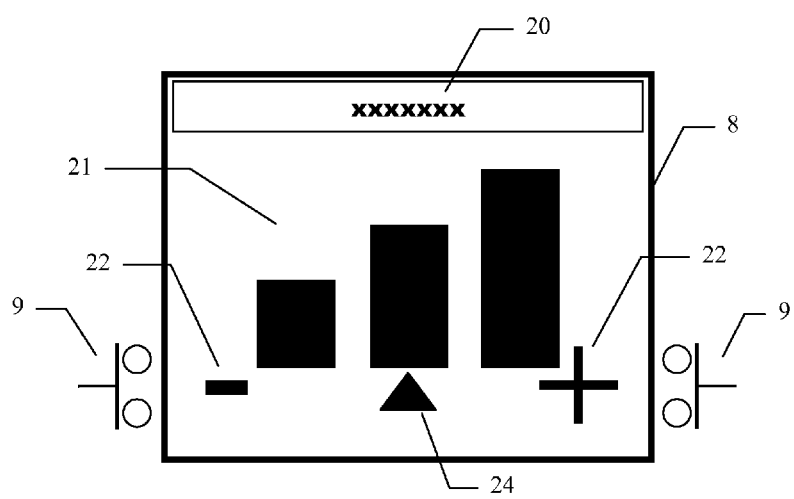

The displayed page can have the appearance shown in FIG. 7, wherein in the central area 21 three bars of different heights are displayed, which could be replaced by numbers 1, 2, 3, by wordings (Low, Medium, High), by initials (L, M, H), by icons, etc.

The buttons 9 associated with the display unit 8 allow the waiting time to be increased or decreased, in accordance with the icons 22, which could however be left out. A single button can also be used, the current selection cyclically passing among the three—or more—displayed alternatives. The current selection can be highlighted for example through the movement of a cursor 24 among the displayed alternatives, making the current selection flash or change color or background, displaying only the icon relating to the current selection, etc.

Still alternatively, the adjustment can be carried out in terms of multiple gearshifting speed, which stands in an inverse relationship with the waiting time(s), the bicycle electronic system 1 taking care of converting the desired multiple gearshifting speed in terms of waiting time(s).

Going back to FIG. 5, once the user is satisfied with the adjustment that has been made, for example upon pressure of one of the buttons 9 associated with the display unit 8, the bicycle electronic system 1 offers the user, for example through a suitable graphical interface made with the display unit 8 and the buttons 9 associated therewith, the possibility of selecting among three alternatives—block 303.

A first alternative consists of saving the time value modified during the adjustment of steps 301 and 302 for later use. In this case, the value stored in the volatile memory 13 is copied into the external static memory 14—block 304.

A second alternative consists of not saving the time value modified during the adjustment of steps 301 and 302 for later use. In this case, the value stored in the external static memory 14 during the course of a previous adjustment—or when the system is switched on for the first time upon leaving the factory if adjustments have never been made—is copied in the volatile memory 13—block 305.

A third alternative consists of not saving and reloading the default values, also deleting the previous adjustments. In this case, the value stored in the internal static memory 12 is copied both into the volatile memory 13 and into the external static memory 14—block 306.

The cyclist could also be allowed to test the new adjustment stored in the volatile memory 13, preserving his/her adjustment previously stored in the external static memory 14, in other words a further alternative upon selection of which none of the blocks 304-306 is carried out.

Irrespectively of the selected alternative, the current value of the volatile memory 13 can later be sent to the other units of the bicycle electronic system 1, through the communication channel 10—block 307, in particular to the display unit 8 and to the driving unit 4, for example in the case of adjustment of the value of the estimated time Ts to carry out a single gearshifting.

It should be understood that in the case of adjustment of several time values it can be provided for that the selection of whether to save, not to save or return to the default values—blocks 303-306—to take place after adjustment—steps 301 and 302—of each time value or of all of the time values.

The adjustment carried out by the user and stored in the external static memory 14 is preserved by the bicycle electronic system 1 also in case it is switched off, as is the default adjustment stored in the internal static memory 12. On the other hand, the time value(s) to be currently used are present in the volatile memory 13 only when the bicycle electronic system 1 is powered.

Figure 8:
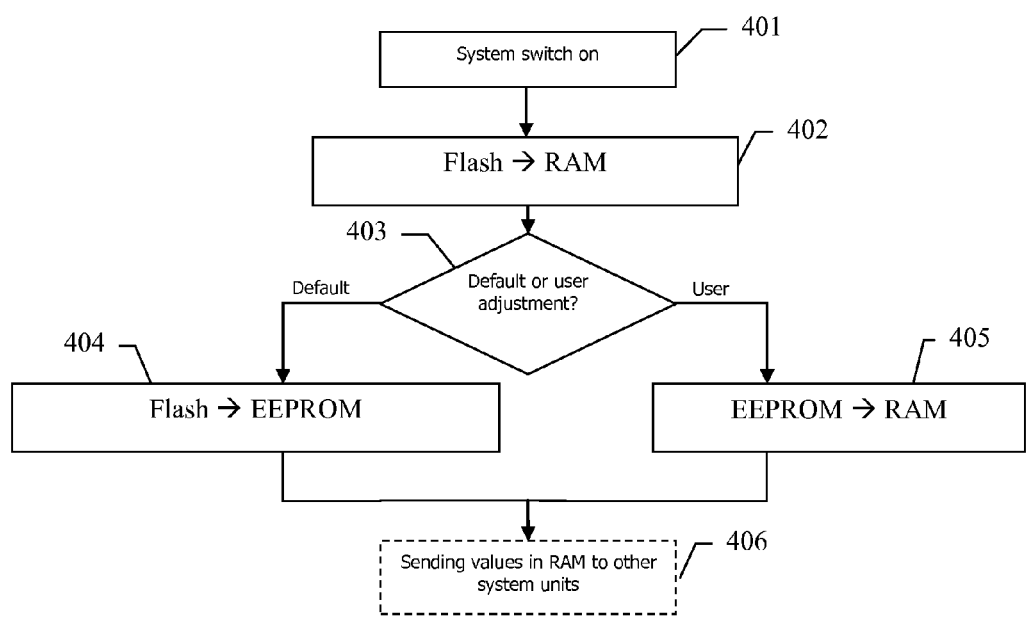
FIG. 8 shows a block diagram of operation for selecting time variables in the system of FIG. 1.
Figure 9:
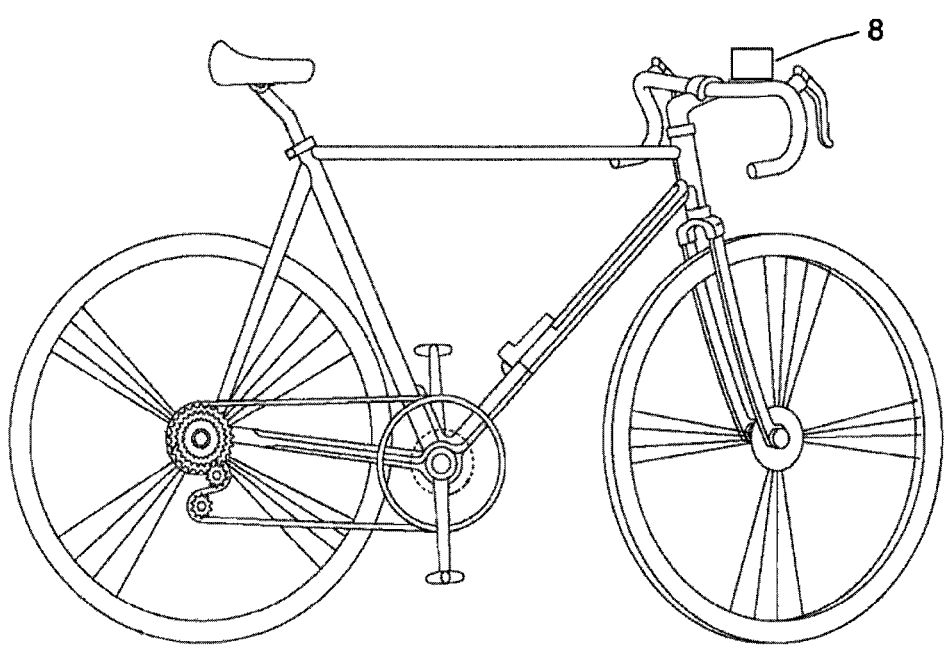
FIG. 9 shows a bicycle using the electronic system.

When the bicycle electronic system 1 is switched on—block 401 of FIG. 8—, the default value(s) contained in the internal static memory 12 is/are copied in the volatile memory 13—block 402.

The bicycle electronic system 1 therefore offers the user the possibility of selecting between two alternatives—block 403—, for example through a suitable graphical interface made analogously to what has been described above.

A first alternative consists of using the default value(s). In this case, the value(s) stored in the internal static memory 12 (and in the volatile memory 13) is/are copied in the external static memory 14—block 404.

A second alternative consists of using the value(s) previously stored by the user. In this case, the value(s) stored in the external static memory 14 is/are copied in the volatile memory 13—block 405, leaving the default value(s) present in the internal static memory 12 unmodified.

Irrespectively of the selected alternative, the current value(s) of the volatile memory 13 can later be sent to the other units of the bicycle electronic system 1, through the communication channel 10—block 307—, in particular to the display unit 8 and to the driving unit 4, for example in the case of adjustment of the value of the estimated time Ts to carry out a single gearshifting.

The copy from the internal static memory 12 to the external static memory 14—block 404—could be left out, therefore preserving a previous user adjustment for the possible use when the electronic system 1 for a bicycle is switched on at a later time.

According to an alternative operating mode, when the bicycle electronic system 1 is switched on it could directly propose the alternative of whether to use the default value(s) or the value(s) stored previously by the user, copying in the volatile memory 13 the value of the internal static memory 12 or of the external static memory 14, respectively.

Furthermore, it should be understood that the data packets P1, P2, P3 ... transmitted from the electronic control unit 2 to the driving unit 4 could lack the indication of the waiting time, the duration of the waiting time T1, T2, T3 ... being defined in the driving unit 4 itself. In this case, if the wait—block 205—is carried out before the actuation of each single gearshifting—blocks 206, 207—, it is suitable to indicate in the data packet P1 the fact that it is a single gearshifting or the first single gearshifting of a multiple gearshifting, so that the driving unit 4 can wait a shorter time with respect to the subsequent gearshiftings to preserve the desired speed of response.

Even more generally, the division of a multiple gearshifting request into at least two single gearshiftings with the interposition of the wait could also be entirely managed within the driving unit 4, the electronic control unit 2 in this case transmitting a multiple gearshifting request, for example a data packet wherein the destination toothed wheel or the number of single gearshiftings to be carried out is identified.

Finally, it should be understood that the possibility of adjusting the waiting times T1, T2, T3, . . . can also be advantageous when the wait takes place in the electronic control unit 2 instead of in the driving unit 4 or when there is a single electronic control and driving unit.

What is claimed is:

1. Method for carrying out a multiple gearshifting in a bicycle gearshift, comprising the steps of:
    a) providing an electronic control unit that transmits at least a first and a second single gearshifting request,
    b) providing a driving unit that receives the first and second single gearshifting requests, and actively monitors the passing of time associated with a deliberate waiting time period, and
    c) the driving unit moves a chain of the gearshift between two adjacent toothed wheels to carry out a first single gearshifting, and carries out a second execution of this step c) for a second single gearshifting after the deliberate waiting time period.

2. Method according to claim 1, further comprising the step of:
    d) the driving unit transmits a successful single gearshifting signal to the electronic control unit.

3. Method according to claim 1, wherein waiting for the deliberate waiting time period is also carried out before the first execution of step c) of moving the chain.

4. Method according to claim 1, wherein step a) of transmitting at least a first and a second single gearshifting request comprises transmitting at least a first and a second data packet containing a time value indicative of the deliberate waiting time period from the electronic control unit to the driving unit.

5. Method according to claim 1, wherein transmission step a) takes place through a communication channel via cable.

6. Method according to claim 1, wherein transmission step a) takes place through a half duplex asynchronous serial communication protocol.

7. Method according to claim 4, wherein the data packet is transmitted at least a second time.

8. Method according to claim 4, wherein the data packet is transmitted with a predetermined repetition frequency until receipt of a successful single gearshifting signal.

9. Method according to claim 4, wherein the time value indicative of the deliberate waiting time period coincides with the deliberate waiting time period.

10. Method according to claim 4, wherein the time value indicative of the deliberate waiting time period is a desired total time to complete a single gearshifting, the step of:
    e) the driving unit calculates the deliberate waiting time period by subtracting an estimated time to carry out a single gearshifting from the time value indicative of the deliberate waiting time period being provided.

11. Method according to claim 10, wherein the estimated time to carry out a single gearshifting is variable.

12. Method according to claim 2, wherein step d) of transmitting a successful single gearshifting signal takes place through a communication channel via cable.

13. Method according to claim 2, wherein step d) of transmitting a successful single gearshifting signal takes place through a half duplex asynchronous serial communication protocol.

14. Method according to claim 1, wherein step a) is carried out as a consequence of a step of:
    f) the electronic control unit receives a manual gearshifting request from the user.

15. Method according to claim 1, comprising the step of:
    g) providing travel parameter sensors that detect travel parameters, and generating the gearshifting request based upon the detected travel parameters.

16. Method according to claim 15, wherein the travel parameters are selected from the group consisting of: travel speed, cranks rotation speed, slope of the travel ground, and cyclist's heart rate.

17. Method according to claim 1, wherein the deliberate waiting time period is comprised between 0 ms and 500 ms.

18. Method according to claim 3, wherein the deliberate waiting time period carried out before the first execution of step c) is comprised between 0 ms and 50 ms.

19. Method according to claim 1, wherein the deliberate waiting time period waited in step c) associated with a single gearshifting following the first single gearshifting of a multiple gearshifting is comprised between 50 ms and 500 ms.

20. Method according to claim 1, wherein the deliberate waiting time period associated with different single gearshiftings of a multiple gearshifting is different.

21. Method according to claim 1, wherein the deliberate waiting time period is a function of the gearshifting direction, of a derailleur, of a specific starting toothed wheel and/or of a specific destination toothed wheel.

22. Method according to claim 1, further comprising the step of:
    h) providing an interface that manually adjusts at least one time value indicative of the deliberate waiting time period and/or an estimated time to carry out a single gearshifting.

23. Method according to claim 22, wherein manual adjustment step h) comprises increasing or decreasing the at least one time value and/or the estimated time to carry out a single gearshifting by an amount at a time.

24. Method according to claim 23, wherein a minimum value and/or a maximum value of the at least one time value and/or of the estimated time to carry out a single gearshifting are provided in the manual adjustment step h).

25. Method according to claim 22, wherein manual adjustment step h) comprises selecting between a predetermined number of alternatives of the at least one time value and/or of the estimated time to carry out a single gearshifting.

26. Method according to claim 22, further comprising a step, following the manual adjustment step h), of:
    i1) the electronic control unit stores for later use the at least one adjusted time value and/or the adjusted estimated time to carry out a single gearshifting.

27. Method according to claim 22, further comprising a step, following the manual adjustment step h), of:
    i2) the electronic control unit returns to a previously adjusted value of the at least one time value and/or of the estimated time to carry out a single gearshifting.

28. Method according to claim 22, further comprising a step, following the manual adjustment step h), of:
    i3) the electronic control unit returns to a default value of the at least one time value and/or of the estimated time to carry out a single gearshifting.

29. Method according to claim 22, further comprising the step of:
    j) the electronic control unit selects for use a default value of the at least one time value and/or of the estimated time to carry out a single gearshifting or a previously adjusted value of the at least one time value and/or of the estimated time to carry out a single gearshifting.

30. Method according to claim 29, wherein step j) of selecting for use is carried out upon switching the electronic system on.

31. Method according to claim 26, wherein step i1) is carried out in the electronic control unit and the method further comprises the step of:
  k) the electronic control unit transmits the adjusted at least one time value and/or estimated time to carry out a single gearshifting to other units of the electronic system.

32. Method according to claim 27, wherein step i2) is carried out in the electronic control unit and the method further comprises the step of:
  k) the electronic control unit transmits the adjusted at least one time value and/or estimated time to carry out a single gearshifting to other units of the electronic system.

33. Method according to claim 28, wherein step i3) is carried out in the electronic control unit and the method further comprises the step of:
  k) the electronic control unit transmits the default at least one time value and/or estimated time to carry out a single gearshifting to other units of the electronic system.

34. Method according to claim 29, further comprising a step, following the manual adjustment step h), of:
  i1) the electronic control unit stores for later use the at least one adjusted time value and/or the adjusted estimated time to carry out a single gearshifting
  and the method further comprises the step of:
  k) the electronic control unit transmits the default or previously adjusted, respectively, at least one time value and/or estimated time to carry out a single gearshifting to other units of the electronic system.

35. Method for electronically controlling a bicycle gearshift, comprising the steps of:
  a) providing an electronic control unit that transmits a gearshifting request that includes a time value indicative of a waiting time,
  b) providing a driving unit that receives the gearshifting request, and
  c) the driving unit moves a gearshift chain between two adjacent toothed wheels to carry out the gearshifting, after
  d) deliberately waiting for the waiting time.

36. Method according to claim 35, further comprising the step of:
  e) the driving unit transmits a successful single gearshifting signal to the electronic control unit.

37. Method according to claim 35, wherein step d) of waiting for a waiting time is carried out before step c) of moving the gearshift chain.

38. Method according to claim 35, wherein step a) of transmitting a single gearshifting request comprises the electronic control unit transmitting a data packet containing the time value indicative of the waiting time to the driving unit.

39. Method according to claim 38, wherein the data packet is transmitted at least a second time.

40. Method according to claim 35, wherein the time value indicative of the waiting time coincides with the waiting time.

41. Method according to claim 35, wherein the time value indicative of the waiting time is a desired total time to complete a single gearshifting, the step of:
  f) the driving unit calculates the waiting time by subtraction of an estimated time to carry out a single gearshifting from the time value being provided.

42. Method according to claim 41, wherein the estimated time to carry out a single gearshifting is variable.

43. Method for carrying out a multiple gearshifting in a bicycle gearshift, comprising the steps of:
  a) providing a driving unit that moves a gearshift chain between two adjacent toothed wheels to carry out a first single gearshifting, and carrying out a second execution of this step a) for a second gearshifting after a deliberate waiting time, and
  b) the driving unit manually adjusts at least one time value indicative of the deliberate waiting time.

44. Method according to claim 43, further comprising the steps of:
  c) providing an electronic control unit that transmits a single gearshifting request, and
  d) the driving unit receives the single gearshifting request.

45. Method according to claim 43, wherein manual adjustment step b) comprises increasing or decreasing the at least one time value by a comparatively small amount at a time.

46. Method according to claim 45, wherein in the manual adjustment step b) a minimum value and/or a maximum value of the at least one time value are provided for.

47. Method according to claim 43, wherein manual adjustment step b) comprises selecting between a predetermined number of alternatives of the at least one time value.

48. Method according to claim 43, further comprising a step, following the manual adjustment step b), of:
  e1) the electronic control unit stores for later use the at least one adjusted time value.

49. Method according to claim 43, further comprising a step, following the manual adjustment step b), of:
  e2) the electronic control unit returns to a previously adjusted value of the at least one time value and/or of an estimated time to carry out a single gearshifting.

50. Method according to claim 43, further comprising a step, following the manual adjustment step c), of:
  e3) the electronic control unit returns to a default value of the at least one time value and/or of an estimated time to carry out a single gearshifting.

51. Method according to claim 43, further comprising the step of:
  f) the electronic control unit selects for use a default value of the at least one time value or a previously adjusted value of the at least one time value.

52. Method according to claim 51, wherein step f) of selecting for use is carried out upon switching the electronic system on.

53. Method according to any one of claims 48, 49, 50, and 51, the method further comprises the step of:
  g) the electronic control unit transmits the adjusted at least one time value to other units of the electronic system.

* * * * *

UNITED STATES PATENT AND TRADEMARK OFFICE
CERTIFICATE OF CORRECTION

PATENT NO. : 8,874,338 B2  Page 1 of 1
APPLICATION NO. : 12/133625
DATED : October 28, 2014
INVENTOR(S) : Federico Miglioranza It is certified that error appears in the above-identified patent and that said Letters Patent is hereby corrected as shown below:

ON THE TITLE PAGE

On the Title Page, item (54), in Title, and in the Specification in Column 1, Line 3, delete "BICYLE" and insert -- BICYCLE --, therefor.

IN THE SPECIFICATION

Column 1, Line 17, delete "wheel at least" and insert -- wheel at at least --, therefor.

Signed and Sealed this
Third Day of March, 2015

Michelle K. Lee
*Deputy Director of the United States Patent and Trademark Office*